US010544737B2

(12) United States Patent
Bowden et al.

(10) Patent No.: US 10,544,737 B2
(45) Date of Patent: Jan. 28, 2020

(54) METHOD AND SYSTEM FOR MITIGATION OF CAVITY RESONANCE

(71) Applicant: GENERAL ELECTRIC COMPANY, Schenectady, NY (US)

(72) Inventors: William Joseph Bowden, Fairfield, OH (US); Ning Fang, Mason, OH (US); Guohua Zhong, Shanghai (CN); Bartosz Karbowski, Mazowieckie (PL)

(73) Assignee: General Electric Company, Schenectady, NY (US)

( * ) Notice: Subject to any disclaimer, the term of this patent is extended or adjusted under 35 U.S.C. 154(b) by 531 days.

(21) Appl. No.: 15/335,795

(22) Filed: Oct. 27, 2016

(65) Prior Publication Data

US 2017/0122213 A1    May 4, 2017

(30) Foreign Application Priority Data

Nov. 2, 2015    (PL) ..................................... P-414651

(51) Int. Cl.
*F02C 7/24*    (2006.01)
*F02C 6/08*    (2006.01)
(Continued)

(52) U.S. Cl.
CPC .................. *F02C 7/24* (2013.01); *F02C 6/08* (2013.01); *F02K 3/06* (2013.01); *F05D 2260/96* (2013.01)

(58) Field of Classification Search
CPC ............... F02C 6/08; F02C 7/185; F02C 9/18
See application file for complete search history.

(56) References Cited

U.S. PATENT DOCUMENTS

| 4,002,024 A | 1/1977 | Nye et al. |
| 5,123,242 A | 6/1992 | Miller |

(Continued)

FOREIGN PATENT DOCUMENTS

| JP | 01177446 A | 7/1989 |
| JP | 2010248980 A | 11/2010 |

OTHER PUBLICATIONS

Extended European Search Report and Opinion issued in connection with corresponding EP Application No. 16196183.4 dated Mar. 7, 2017.

(Continued)

*Primary Examiner* — Gerald L Sung
*Assistant Examiner* — Colin J Paulauskas
(74) *Attorney, Agent, or Firm* — Dority & Manning, P.A.

(57) ABSTRACT

A turbofan engine includes a core engine, a fan, a fan bypass duct partially surrounding the core engine and the fan, and a bleed system. The bleed system includes a first bleed circuit configured to bleed pressurized air from the core engine and channel the flow to a first circuit of a heat exchanger, and a second bleed circuit configured to bleed fan air from the fan bypass duct and channel the flow to a second circuit of the heat exchanger. The second bleed circuit includes a bleed duct including a duct inlet and a duct outlet coupled in flow communication with the heat exchanger through a valve. The bleed duct also includes an acoustic suppression conduit extending from the bleed duct upstream of the valve to the fan bypass duct and sized to suppress pressure oscillations inside the second bleed circuit when the valve is at least partially closed.

20 Claims, 2 Drawing Sheets

(51) Int. Cl.
*F02C 9/18* (2006.01)
*F02K 3/06* (2006.01)

(56) References Cited

U.S. PATENT DOCUMENTS

| | | | |
|---|---|---|---|
| 5,279,109 A | 1/1994 | Liu et al. | |
| 5,351,476 A | 10/1994 | Laborie et al. | |
| 5,655,359 A | 8/1997 | Campbell et al. | |
| 5,699,981 A | 12/1997 | McGrath et al. | |
| 5,729,969 A | 3/1998 | Porte | |
| 5,782,077 A | 7/1998 | Porte | |
| 6,050,527 A | 4/2000 | Hebert et al. | |
| 6,264,137 B1 | 7/2001 | Sheoran | |
| 6,264,138 B1 | 7/2001 | Sheoran | |
| 6,860,991 B1 * | 3/2005 | Hagon | E03C 1/29 210/163 |
| 7,607,308 B2 * | 10/2009 | Kraft | F02C 6/08 60/226.1 |
| 7,708,230 B2 | 5/2010 | Cloft et al. | |
| 8,024,935 B2 * | 9/2011 | Hoover | F01D 17/105 60/226.1 |
| 2010/0126182 A1 | 5/2010 | Hoover et al. | |
| 2015/0114481 A1 | 4/2015 | Willie et al. | |

OTHER PUBLICATIONS

Unofficial English Translation of Polish Search Report issued in connection with corresponding PL Application No. P-414651 dated Feb. 7, 2017.

Machine Translation and First Office Action and Search issued in connection with corresponding CN Application No. 201610945099.1 dated Nov. 30, 2017.

Decision to grant issued in connection with corresponding PL Application No. P-414651 dated Dec. 20, 2018.

* cited by examiner

METHOD AND SYSTEM FOR MITIGATION OF CAVITY RESONANCE

BACKGROUND

The field of the disclosure relates generally to gas turbine engines and, more particularly, to a method and system for suppressing resonance in air bleeding systems in gas turbine engines.

At least some known modern aircraft are powered by turbofan aircraft engines. The turbofan engine is a specialized form of gas turbine engine in which air flows through a fan and compressor that pressurizes the air, which is then mixed with fuel in a combustor for generating hot combustion gases. A core engine includes the compressor and combustor and cooperating high and low pressure turbines that extract energy from the combustion gases for powering the compressor and fan, respectively.

At least some known engines include bleed systems having a bleed duct that harvests a portion of the fan bypass air and channels the air downstream for further processing or use. A valve is typically present within the bypass duct to control the amount of air channeled from the bypass duct to other engine components. When the valve is closed at the outlet end of the bleed duct, the inlet end of the bleed duct remains open and is subject to the rush of incoming fan bypass air. This configuration may result in the formation of a Hartmann Generator that causes unstable dynamic pressure oscillations inside the closed bleed duct which can lead to sonic fatigue and result in a shortened service lifetime of certain engine components.

BRIEF DESCRIPTION

In one aspect, a turbofan engine is provided. The turbofan engine includes a core engine including a multistage compressor, a fan powered by the core engine, a fan bypass duct at least partially surrounding the core engine and the fan, and a bleed system. The bleed system includes a first bleed circuit configured to bleed a flow of pressurized air from the compressor and channel the flow to a first circuit of a heat exchanger, and a second bleed circuit configured to bleed fan air from the fan bypass duct and channel the flow to a second circuit of the heat exchanger. The second bleed circuit includes a bleed duct including a duct inlet facing forwardly at a surface of the bypass duct and a duct outlet coupled in flow communication with the heat exchanger through a valve. The bleed duct also includes an acoustic suppression conduit extending from the bleed duct upstream of the valve to the fan bypass duct. The acoustic suppression conduit is sized to suppress pressure oscillations inside the second bleed circuit when the valve is at least partially closed.

In another aspect, a method of suppressing resonant acoustic noise in a bleed circuit of a duct is provided. The method includes channeling a first portion of flow from the duct into the bleed circuit through a bleed circuit inlet, and returning a second portion of flow from the bleed circuit to the duct downstream of the bleed circuit inlet through an acoustic suppression conduit.

In yet another aspect, a bleed system is provided. The bleed system includes a first bleed circuit configured to bleed air from a duct. The first bleed circuit includes a bleed duct including a duct inlet facing upstream relative to a flow in the duct at a surface of the duct and a duct outlet coupled in flow communication with a valve. The first bleed circuit also includes an acoustic suppression conduit extending from the bleed duct upstream of the valve to the duct. The acoustic suppression conduit is configured to suppress pressure oscillations inside the first bleed circuit when the valve is at least partially closed.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
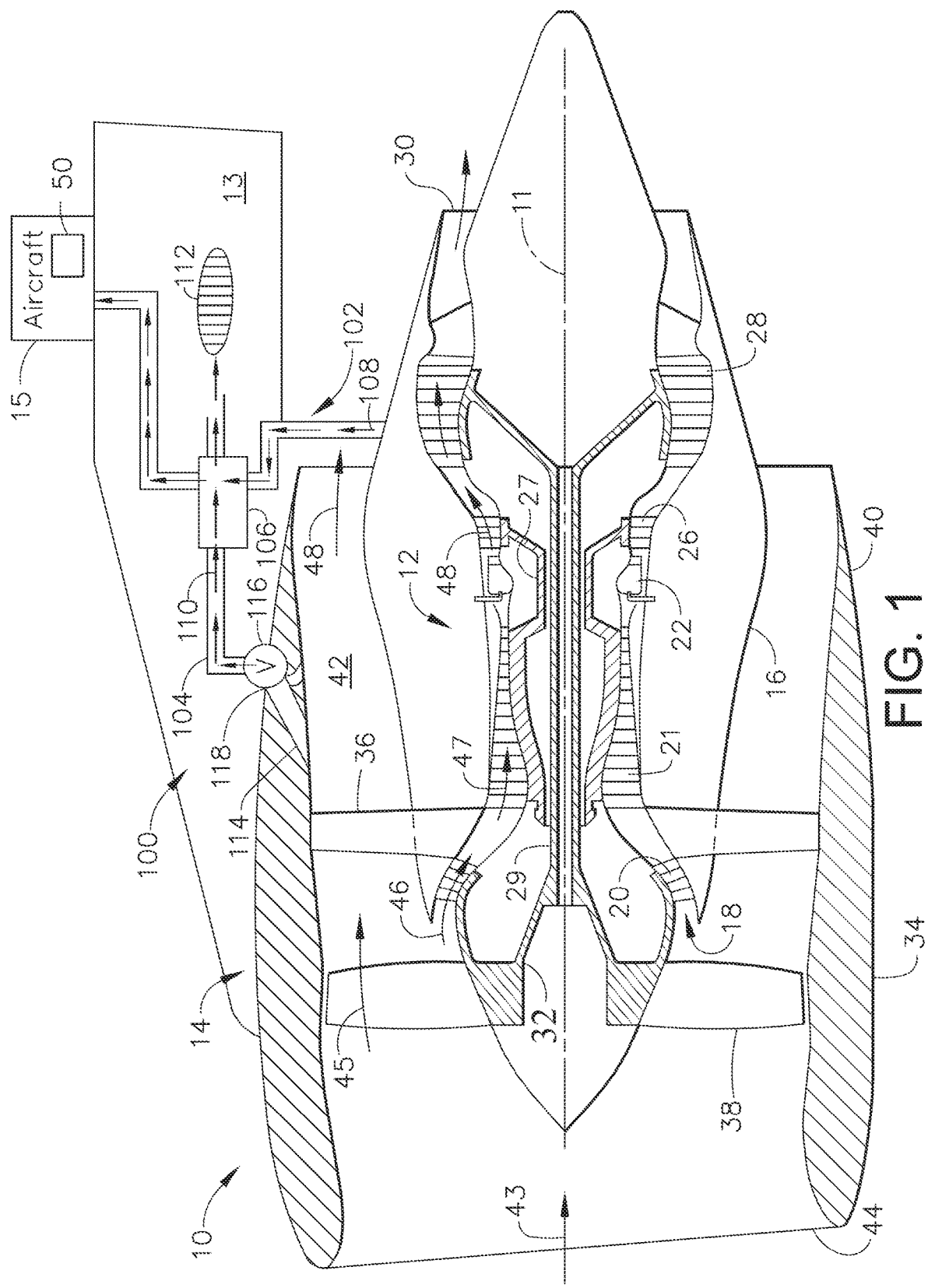
FIG. 1 is a cross-sectional view of an exemplary turbine engine assembly including an exemplary air bleed system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The bleed systems described herein provide an efficient method for suppressing pressure oscillations in associated devices and systems. Specifically, the bleed systems described herein include a bleed duct that, when a bleed valve is open, harvests a portion of the fan bypass air and channels the air downstream for further processing or use. When the bleed valve is closed at the outlet end of the bleed duct, the inlet end of the bleed duct remains open and is subject to the rush of incoming fan bypass air. As such, to provide the air within the bleed duct with an outlet and to suppress pressure oscillations inside the bleed duct, an acoustic suppression conduit extends from the bleed duct to the bypass duct. Accordingly, the acoustic suppression conduit is configured to prevent the bleed duct from operating as a Hartmann Generator when the bleed valve is at least partially closed.

The bleed system including the acoustic suppression conduit described herein may offer advantages over known methods of suppressing pressure oscillations. More specifically, some known bleed systems include an actively controlled variable geometry inlet on the bypass duct to reduce resonance within the duct. The acoustic suppression conduit described herein is a static component that reduces the weight and complexity of the aircraft engine. Furthermore, some known bleed systems include a static device, such as a resonance hood, that extends into the bypass air stream at the bypass duct inlet to reduce resonance within the duct. However, the acoustic suppression conduit described herein is not exposed to any portion of a free air stream and no portion of the exemplary bleed system extends into the bypass duct.

FIG. 1 shows a cross-sectional view of an exemplary turbine engine assembly 10 having a longitudinal or centerline axis 11 therethrough and mounted to a supporting pylon 13 of an aircraft 15. Assembly 10 includes a core turbine engine 12, hereinafter referred to as core engine 12, and a fan section 14 positioned upstream of core engine 12. Core engine 12 includes a generally tubular outer casing 16 that defines an annular inlet 18. In some embodiments, outer casing 16 further encloses and supports a booster compressor 20 for raising the pressure of air entering core engine 12. A high pressure, multi-stage, axial-flow high pressure compressor 21 receives pressurized air from booster 20 and further increases the pressure of the air. The pressurized air flows to a combustor 22, where it is mixed with fuel and ignited. The hot combustion gases flow from combustor 22 to a first (high pressure) turbine 26 for driving high pressure compressor 21 through a first (high pressure) drive shaft 27, and then to a second (low pressure) turbine 28 for driving booster compressor 20 and fan section 14 through a second (low pressure) drive shaft 29 that is coaxial with first drive shaft 27. After driving each of turbines 26 and 28, the combustion products leave core engine 12 through an exhaust nozzle 30 to provide propulsive jet thrust.

Fan section 14 includes a rotatable, axial-flow fan rotor 32 surrounded by an annular fan casing 34. Fan casing 34 is supported from core engine 12 by a plurality of substantially radially-extending, circumferentially-spaced outlet guide vanes 36. Accordingly, fan casing 34 encloses fan rotor 32 and a plurality of fan rotor blades 38. A downstream section 40 of fan casing 34 extends over an outer portion of core engine 12 to define a bypass duct 42 that provides additional propulsive jet thrust.

In operation, an initial air flow 43 enters turbine engine assembly 10 through an inlet 44 to fan casing 34. Air flow 43 passes through fan blades 38 and splits into a first compressed air flow (represented by arrow 45) and a second compressed air flow (represented by arrow 46) which enters booster compressor 20. The pressure of second compressed air flow 46 is increased and enters high pressure compressor 21, as represented by arrow 47. After mixing with fuel and being combusted in combustor 22 combustion products 48 exit combustor 22 and flow through first turbine 26. Combustion products 48 then flow through second turbine 28 and exit exhaust nozzle 30 to provide thrust for turbine engine assembly 10.

In the exemplary embodiment, assembly 10 also includes an air bleed system 100 for bleeding pressurized air from compressor 21 during operation for subsequent use in aircraft 15 when desired. Bleed system 100 includes a first bleed circuit 102, a second bleed circuit 104, and a heat exchanger 106, which is coupled to pylon 13. First bleed circuit 102 includes conduits and valves for bleeding pressurized air from compressor 21 through a first circuit 108 of heat exchanger 106. For example, first bleed circuit 102 is configured for bleeding both fifth and ninth stage pressurized air, at increasing pressure and temperature, from compressor 21 and through heat exchanger 106 for subsequent use in aircraft 15.

In the exemplary embodiment, second bleed circuit 104 includes various components for bleeding a portion of the relatively cool pressurized fan air 45 from fan bypass duct 42 for flow through a secondary circuit 110 of heat exchanger 106. Relatively cool fan air 45 is circulated through heat exchanger 106 for cooling the higher temperature compressor bleed air being channeled through first bleed circuit 102.

The spent fan air from second bleed circuit 104, after cooling the primary bleed circuit air, is discharged from heat exchanger 106 through a suitable outlet 112 in pylon 13 and dumped overboard during aircraft operation. The cooled compressor bleed air from first bleed circuit 102 is discharged from heat exchanger 106 suitably channeled into aircraft 15 for any suitable purpose, such as, but not limited to, use in the aircraft environmental control system.

In the exemplary embodiment, bleed system 100 is suitably controlled by a conventional aircraft control system 50, which is operatively joined to the various valves therein, both in first bleed circuit 102 as well as in second bleed circuit 104. More specifically, second bleed circuit 104 includes a fan bleed duct 114 configured for bleeding a portion of fan air 45 from fan bypass duct 42 through a suitable control valve 116 disposed at an outlet 118 of bleed duct 114, which in turn is suitably joined to secondary circuit 110 of heat exchanger 106.

Valve 44 is electrically coupled to aircraft control system 50 and may be operated in an open position allowing unobstructed flow of fan air 45 through bleed duct 114 into heat exchanger 106, and in an at least partially closed position blocking at least a portion of the passage of fan air 45 through bleed duct 114 into heat exchanger 106 to prevent the undesirable dynamic pressure oscillations described above due to the Hartmann Generator principle.

Figure 2:
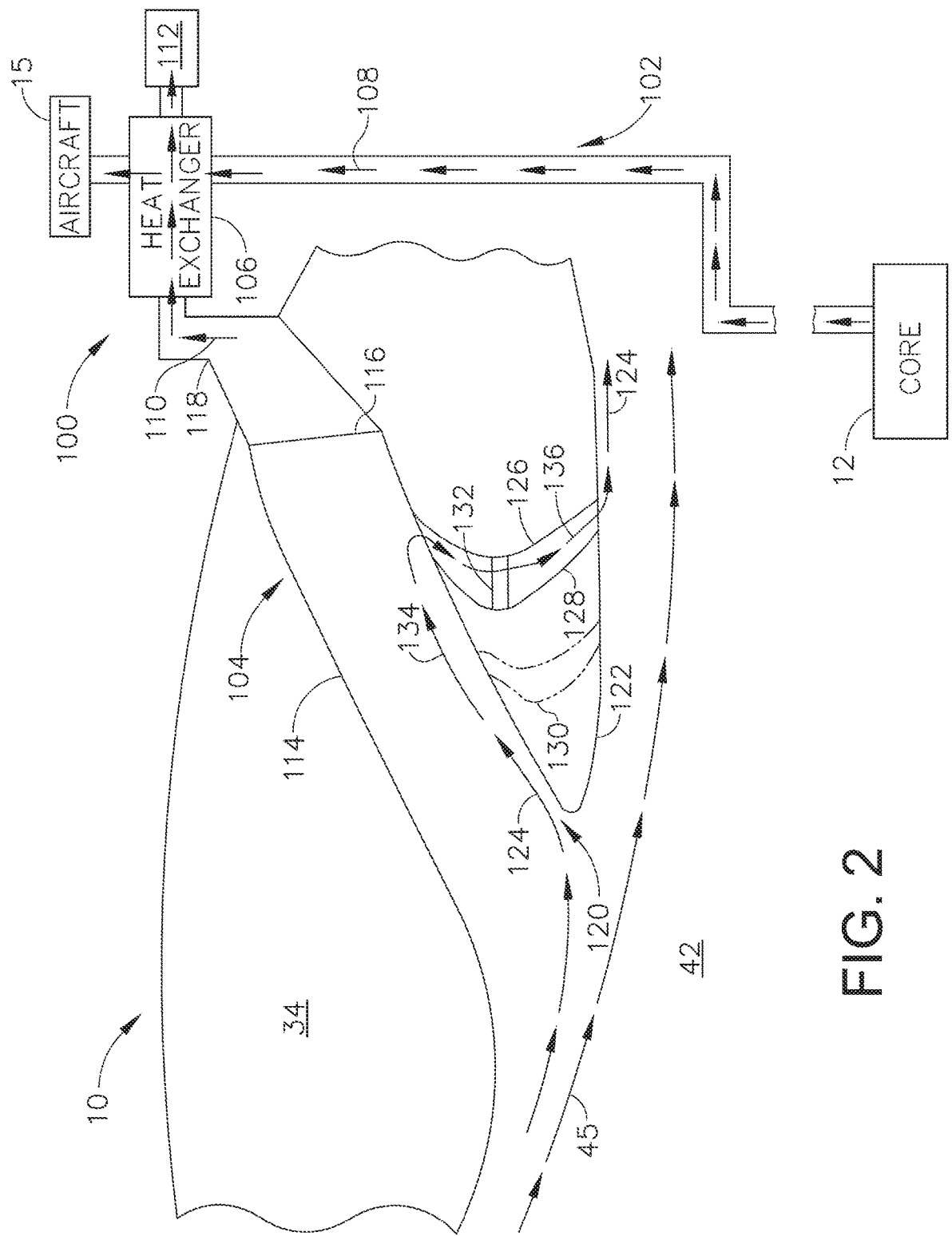
FIG. 2 is an enlarged view of the bleed system shown in FIG. 1 including an exemplary air bleed duct.

FIG. 2 shows a specific configuration of fan bleed duct 114 when mounted in engine 10 at the discharge end of fan bypass duct 42. As described above, turbofan engine 10 is supported from pylon 13 in a conventional manner typically utilizing forward and aft engine mounts and cooperating thrust links. Although FIGS. 1 and 2 show bleed duct 114 extending through fan casing 34, in another embodiment, bleed duct 114 is mounted within a bifurcation (not shown) extending between core engine 12 and pylon 13.

In the exemplary embodiment, bleed duct 114 includes an inlet 120 at the forward end thereof and formed in a surface 122 of fan bypass duct 42. Inlet 120 faces forwardly and captures a portion 124 of pressurized fan air 45 from bypass duct 42 and channels portion 124 through bleed duct 114 and outlet 118 thereof into heat exchanger 106 through valve 116. Bleed duct outlet 118 is defined at an opposite aft end of bleed duct 114 with respect to inlet 120. Outlet 118 is suitably coupled in flow communication with heat exchanger 106 through valve 116 of second bleed circuit 104. Valve 116 couples in flow communication bleed duct outlet 118 with heat exchanger 106 for controlling flow of fan bypass air 45 into secondary circuit 110 of heat exchanger 106 when desired.

However, when valve 116 is closed, bleed duct 114 may operate as a Hartmann Generator. In such a configuration, duct outlet 118 is closed while duct inlet 120 remains open and directly receives pressurized fan air 124 from bypass duct 42. Unstable dynamic pressure oscillations may occur in fan air 124 trapped inside closed bleed duct 114 as air 124 impinges closed valve 116 and duct 114 walls. Leaving valve 116 partially open is not always a feasable solution to this dynamic oscillation problem since such operation may adversely affect the performance of the downstream heat exchanger system 106.

In the exemplary embodiment, bleed duct 114 includes an acoustic suppression conduit 126 sized to suppress pressure oscillations inside bleed duct 114 when valve 116 is at least partially closed. As such, acoustic suppression conduit 126 is configured to prevent bleed duct 114 operation as a Hartmann Generator. Correspondingly, when valve 116 is open, acoustic suppression conduit 126 is shaped such that very little flow will move through acoustic suppression conduit 126, thus minimizing the impact to overall efficiency of engine 10 in its specific aircraft engine application.

In the exemplary embodiment, acoustic suppression conduit 126 extends between bleed duct 114 upstream from valve 116 to bypass duct 42 along an arcuate path. Such an arcuate shape of acoustic suppression conduit 126 causes airflow 124 to more easily enter acoustic suppression conduit 126 within bleed duct 114 when valve 116 is closed. The arcuate shape of suppression conduit 126 also facilitates expelling airflow 124 from acoustic suppression conduit 126 into bypass duct 42 at an angle substantially similar to an angle of travel of airflow 45 to facilitate efficient mixing of the air streams and minimize impact to efficiency of engine 10. Alternatively, acoustic suppression conduit 126 has any shape that enables bleed system 100 to operate as described herein.

In addition to the arcuate shape, in the exemplary embodiment, acoustic suppression conduit 126 includes a cross-sectional shape that varies along a length of acoustic suppression conduit 126 from bleed duct 114 upstream from valve 116 to bypass duct 42. A varying cross-sectional shape may be beneficial when the acoustic suppression conduit 126 must maintain adequate clearance to nearby hardware in the region of bleed duct 114.

In the exemplary embodiment, acoustic suppression conduit 126 includes a plurality of acoustic suppression tubes extending between bleed duct 114 upstream from valve 116 to bypass duct 42. More specifically, acoustic suppression conduit 126 includes a first acoustic suppression tube 128 and an optional second acoustic suppression tube 130 (shown in dashed lines). Although FIG. 2 shows both first and second tubes 128 and 130 being similarly shaped, tubes 128 and 130 may have any shape, including different shapes from each other, that facilitates operation of bleed system 100 as described herein.

The amount of resonance amplitude reduction is related to the cross-sectional area of acoustic suppression conduit 126. More specifically, larger cross-sectional area facilitates a greater reduction in resonance amplitude. As such, a single tube 128 of acoustic suppression conduit 126 may be beneficial to suppress pressure oscillations in the most weight efficient manner. However, in configurations where other engine structures are in place, a large acoustic suppression conduit 126 may be difficult to implement. As such, plurality of tubes 128 and 130 may be required to suppress pressure oscillations to a desired level.

In the exemplary embodiment, acoustic suppression conduit 126 includes at least one vane 132 extending across the cross-section thereof. Vane 132 directing airflow 124 being channeled through acoustic suppression conduit 126 such that airflow 124 efficiently flows from bleed duct 114 to bypass duct 42. Vane 132 increases the structural integrity of acoustic suppression conduit 126. Additionally, vane 132 facilitates movement of air flow 124 efficiently through suppression conduit 126 and merging with bypass flow 45.

In operation, when valve 116 is open, fan pressurized air 45 is channeled through bypass duct 42 and bleed system 100 captures a portion 124 of fan air 45 and channels airflow 124 through second bleed circuit 104 to heat exchanger 106 for cooling a higher temperature airflow channeled through first bleed circuit 102 from core engine 12. After cooling, airflow 124 is channeled to outlet 112 and discharged from aircraft 15. Alternatively, air flow 124 is discharged by engine 10 via an undercowl cooling exhaust and associated vent nozzle (neither shown).

However, when valve 116 is closed, a portion 124 of pressurized flow 45 is channeled into bleed duct 114 and then through acoustic suppression conduit 126 into bypass duct 42. More specifically, airflow 124 includes a first portion 134 and a second portion 136. First portion 134 is channeled from bypass duct 42 into second bleed circuit 104, and more specifically, bleed duct 114, through inlet 120. Second portion is then channeled from within bleed duct 114 through acoustic suppression conduit 126 to bypass duct 42 downstream of bleed duct inlet 120. In the exemplary embodiment, acoustic suppression conduit 126 is sized such that substantially an entirety of the volume of airflow 124 channeled through inlet 120 and into bleed duct 114 is then subsequently channeled through acoustic suppression conduit 126. As such, the volume of airflow first portion 134 entering inlet 120 is approximately equal to the volume of airflow second portion 136 channeled through acoustic suppression conduit 126 and discharged into bypass duct 42.

In the exemplary embodiment, airflow second portion 136 is discharged from acoustic suppression conduit 126 in a downstream direction relative to pressurized air 45 in bypass duct 42. Similarly, airflow second portion 136 enters acoustic suppression conduit 126 in an upstream direction relative to pressurized air 45 in bypass duct 42 and relative to the location where airflow second portion 136 is discharged from acoustic suppression conduit 126.

The above-described bleed systems provide an efficient method for suppressing pressure oscillations in associated devices and systems. Specifically, the above-described bleed system includes a bleed duct that, when a bleed valve is open, harvests a portion of the fan bypass air and channels the air downstream for further processing or use. When the bleed valve is closed at the outlet end of the bleed duct, the inlet end of the bleed duct remains open and is subject to the rush of incoming fan bypass air. As such, to provide the air within the bleed duct with an outlet and to suppress pressure oscillations inside the bleed duct, an acoustic suppression conduit extends from the bleed duct to the bypass duct. Accordingly, the acoustic suppression conduit is configured to prevent the bleed duct from operating as a Hartmann Generator when the bleed valve is at least partially closed.

The bleed system including the acoustic suppression conduit described herein may offer advantages over known methods of suppressing pressure oscillations. More specifically, some known bleed systems include an actively controlled variable geometry inlet on the bypass duct to reduce resonance within the duct. However, the acoustic suppression conduit described herein is a static component that reduces the weight and complexity of the aircraft engine. Furthermore, some known bleed systems include a static device, such as a resonance hood, that extends into the bypass air stream at the bypass duct inlet to reduce resonance within the duct. However, the acoustic suppression conduit described herein is not exposed to any portion of a free air stream and no portion of the exemplary bleed system extends into the bypass duct.

An exemplary technical effect of the methods, systems, and apparatus described herein includes at least one of: (a) reducing or preventing pressure oscillations within the bleed duct, this increasing the lifetime of associated components; (b) reducing the weight and maintenance costs associated with the bleed system as compared to conventional bleed systems because the disclosed system does not include variable geometry or moving parts; and (c) increasing the energy efficiency of systems compared to conventional bleed systems because of the disclosed bleed system's minimal increase in bypass flow total pressure loss.

Exemplary embodiments of bleed systems are described above in detail. The bleed systems, and methods of operating such systems and devices are not limited to the specific embodiments described herein, but rather, components of systems and/or steps of the methods may be utilized independently and separately from other components and/or steps described herein. For example, the methods may also be used in combination with other systems requiring acoustic suppression, and are not limited to practice with only the systems and methods as described herein. Rather, the exemplary embodiment can be implemented and utilized in connection with many other machinery applications that are currently configured to receive and accept bleed systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbofan engine assembly, comprising:
   a core engine including a multistage compressor;
   a fan powered by said core engine; a fan bypass duct at least partially surrounding said core engine and said fan; and
   a bleed system comprising:
   a first bleed circuit configured to bleed a flow of pressurized air from said compressor and channel the flow to a first circuit of a heat exchanger; and
   a second bleed circuit configured to bleed fan air from said fan bypass duct and channel the flow to a second circuit of the heat exchanger, said second bleed circuit comprising a bleed duct comprising:
   a duct inlet facing upstream relative to a flow in the bypass duct at a surface of said bypass duct;
   a duct outlet coupled in flow communication with said heat exchanger through a valve; and
   an acoustic suppression conduit extending from said bleed duct upstream of said valve to said fan bypass duct, said acoustic suppression conduit configured to suppress pressure oscillations inside said second bleed circuit when said valve is at least partially closed, said acoustic suppression conduit comprising an outlet formed in the surface of the bypass duct spaced from the duct inlet.

2. The turbofan engine assembly of claim 1, wherein said acoustic suppression conduit extends from said bleed duct upstream of said valve to said fan bypass duct along an arcuate path.

3. The turbofan engine assembly of claim 1, wherein a cross section of said acoustic suppression conduit varies along a path from said bleed duct upstream relative to a flow in the bypass duct of said valve to said fan bypass duct.

4. The turbofan engine assembly of claim 1, wherein said acoustic suppression conduit comprises a plurality of acoustic suppression tubes extending from said bleed duct upstream relative to a flow in the bypass duct of said valve to said fan bypass duct.

5. The turbofan engine assembly of claim 1, wherein said acoustic suppression conduit comprises at least one vane extending across a cross section thereof.

6. The turbofan engine assembly of claim 1, wherein said acoustic suppression conduit is sized and shaped to discharge an airflow into said fan bypass duct at a predetermined angle substantially similar to an angle of airflow within said fan bypass duct.

7. The turbofan engine assembly of claim 1, wherein said acoustic suppression conduit is configured to prevent deadheading of said second bleed circuit when said valve is closed.

8. A method of suppressing resonant acoustic noise in a bleed circuit of
   a duct, the method comprising:
   channeling a first portion of flow from the duct into the bleed circuit through a bleed circuit inlet; and
   returning a second portion of flow from the bleed circuit to the duct downstream of the bleed circuit inlet through an acoustic suppression conduit outlet formed in a surface of the duct spaced from said bleed circuit inlet to suppress resonant acoustic noise in the bleed circuit.

9. The method of claim 8, wherein returning a second portion of flow comprises returning the second portion of flow that is approximately equal to the first portion of flow.

10. The method of claim 8, wherein returning a second portion of flow from the bleed circuit to the duct comprises channeling the second portion of flow through an arcuate path from the bleed circuit to the duct through the bleed circuit.

11. The method of claim 8, wherein returning a second portion of flow from the bleed circuit to the duct comprises channeling the second portion of flow through a plurality of acoustic suppression tubes from the bleed circuit to the duct.

12. The method of claim 8, wherein returning a second portion of flow from the bleed circuit to the duct through an acoustic suppression conduit comprises directing the second portion of flow to exit the acoustic suppression conduit in a downstream direction relative to a flow in the duct.

13. The method of claim 8, wherein returning a second portion of flow from the bleed circuit to the duct through an acoustic suppression conduit comprises directing the second portion of flow to enter the acoustic suppression conduit in an upstream direction relative to a flow in the duct.

14. The method of claim 8, wherein returning a second portion of flow from the bleed circuit to the duct through an acoustic suppression conduit comprises preventing deadheading of the duct when said valve is closed.

15. A bleed system comprising:
a first bleed circuit configured to bleed air from a duct, said first bleed circuit comprising a bleed duct comprising:
a bleed duct inlet facing upstream relative to a flow in the bleed duct at a surface of the bleed duct;
a bleed duct outlet coupled in flow communication with a valve; and
an acoustic suppression conduit extending from said bleed duct upstream of said valve to the bleed duct, said acoustic suppression conduit configured to suppress pressure oscillations inside said first bleed circuit when said valve is at least partially closed, said acoustic suppression conduit comprising an outlet formed in the surface of the bypass duct spaced from the duct inlet.

16. The system of claim 15, wherein said acoustic suppression conduit extends from said bleed duct upstream of said valve to the bleed duct along an arcuate path.

17. The system of claim 15, wherein a cross section of said acoustic suppression conduit varies along a path from said bleed duct upstream of said valve to the bleed duct.

18. The system of claim 15, wherein said acoustic suppression conduit comprises a plurality of acoustic suppression tubes extending from said bleed duct upstream of said valve to the bleed duct.

19. The system of claim 15, wherein said acoustic suppression conduit comprises at least one vane extending across a cross section thereof.

20. The system of claim 15, wherein said acoustic suppression conduit prevents deadheading of said bleed duct upstream of said valve when said valve is closed.

* * * * *